United States Patent

[11] 3,580,593

| [72] | Inventor | Lynn H. Sprunger |
| | | P.O. Box 78, Albion, Ind. 46701 |
| [21] | Appl. No. | 815,575 |
| [22] | Filed | Apr. 14, 1969 |
| [45] | Patented | May 25, 1971 |

[54] ANTISWAY SUSPENSION SYSTEM FOR AN AXLED VEHICLE
6 Claims, 4 Drawing Figs.

[52] U.S. Cl. ..................................................... 280/124
[51] Int. Cl. ..................................................... B60g 9/00
[50] Field of Search ............................................ 280/124, 106.5; 267/63

[56] References Cited
UNITED STATES PATENTS
2,995,383   8/1961   Barker.......................... 267/63X
2,758,832   8/1956   Hickman....................... 280/124X Primary Examiner—Philip Goodman
Attorney—Oltsch & Knoblock ABSTRACT: A suspension system having antisway properties for an axled vehicle. The vehicle includes a frame having a pair of spaced longitudinal members. A rigid elongated support member is spaced below and substantially parallel to each longitudinal frame member. A transverse axle is positioned below the longitudinal frame members and is secured to each support member intermediate the end portions thereof. A suspension unit is carried by each support member end portion and serves to interconnect the adjacent overlying longitudinal frame member with the support member. Each suspension unit includes upper and lower spaced brackets secured to the longitudinal frame and support members respectively and interconnected by resilient means which transmit the vehicle load to the axle.

PATENTED MAY 25 1971
3,580,593
SHEET 1 OF 2
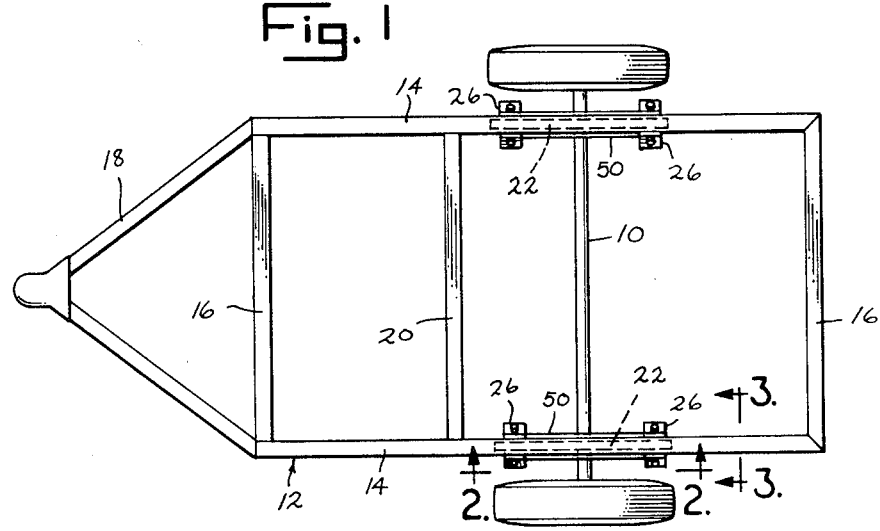
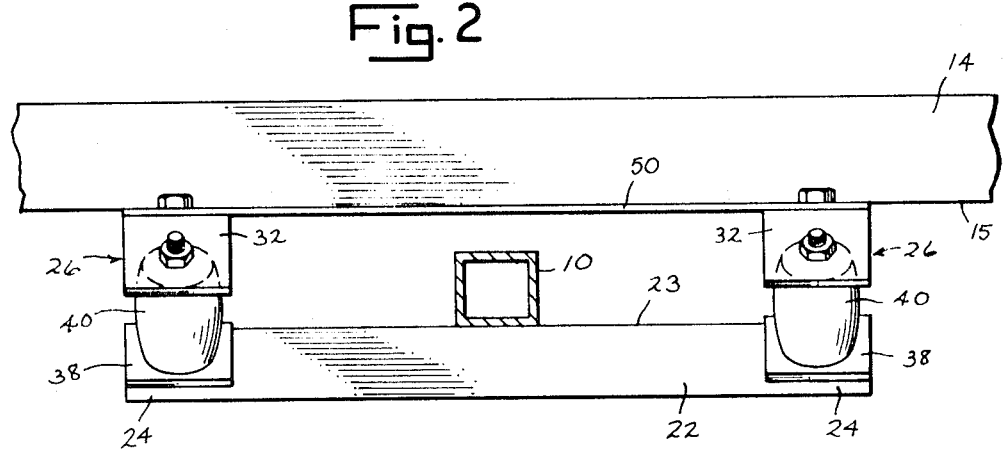
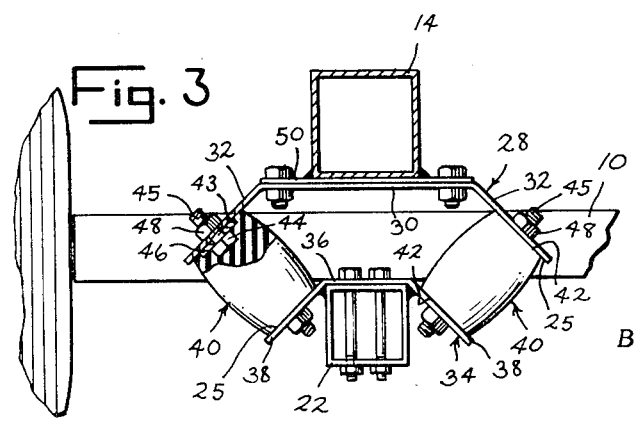
INVENTOR.
LYNN H. SPRUNGER
BY Oltsch & Knoblock
ATTORNEYS

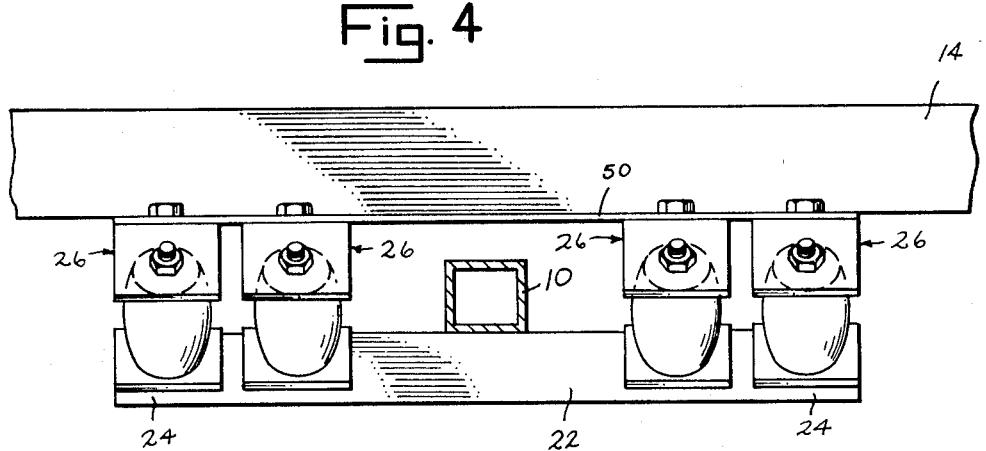

3,580,593

ANTISWAY SUSPENSION SYSTEM FOR AN AXLED VEHICLE

BACKGROUND OF THE INVENTION

This invention relates to a suspension system for axled vehicles and includes means for controlling sidesway of the vehicle.

Other suspension systems for axled vehicles, such as that disclosed in U.S. Pat. No. 2,973,951, utilizing resilient members positioned between bracket parts which serve to interconnect the frames with the axle and spring assemblies of the vehicles are of such a construction that in each vehicle the body of the vehicle is carried well above the vehicle axle, thus causing the vehicle to have a high center of gravity with a resulting sacrifice in the antisway property of its suspension system. Additionally, these prior-art suspension systems are of a permanent type construction and do not readily lend themselves to adjustment or change in order to accommodate an increase or decrease in vehicle load.

The suspension system of my invention overcomes the above-mentioned disadvantages of the above-mentioned prior-art suspension systems by (a) causing the axle to be positioned closer to the frame of the trailer thereby lowering the center of gravity of the vehicle and (b) providing individual suspension units which can be quickly and easily removed from or added to the vehicle to accommodate changes in vehicle load.

SUMMARY OF THE INVENTION

This invention concerns a suspension system for an axled vehicle having a frame which includes a pair of spaced longitudinal members. A rigid elongated support member is spaced below and substantially parallel to each longitudinal frame member. A transverse axle is positioned below the longitudinal frame members and is secured to each support member intermediate the end portions thereof. At least one suspension unit is secured to each support member end portion and serves to connect the support member with the adjacent overlying frame member. Each suspension unit comprises a lower bracket, an upper bracket and interconnecting resilient means. The lower bracket is secured to the support member end portion and includes diverging end parts which extend outwardly from opposite sides of the support member and which are laterally positioned relative to the axle. The upper bracket is spaced above each lower bracket and is secured to the adjacent longitudinal frame member. The upper bracket includes diverging end parts which extend outwardly from opposite sides of the frame member and which parallel corresponding end parts of the lower bracket. A resilient means is positioned between and interconnects each of the corresponding end parts of the upper and lower brackets and serves to transfer a portion of the vehicle load to the axle and accommodate changes in the vehicle load.

Each suspension unit is preferably releasably secured to the support member and adjacent longitudinal frame member with the frame member and each support member end portion being adapted to accommodate a plurality of suspension units, the number of which will vary depending upon the load the vehicle is to carry.

Accordingly, it is an object of this invention to provide a suspension system for axled vehicles which allows the vehicle to have a low center of gravity and which serves to reduce sidesway of the vehicle.

Another object of this invention is to provide a suspension system for an axled vehicle having suspension units which interconnect the frame of the vehicle to the axle of the vehicle and which can be easily attached to and detached from the vehicle and varied in number so as to accommodate various vehicle loads.

Other objects of this invention will become apparent upon a reading of the invention's description.

BRIEF DESCRIPTION OF THE DRAWING

FIG. 1 is a top plan view of a vehicle frame and axle assembly having the suspension system of this invention attached thereto.

FIG. 2 is a fragmentary side view of the vehicle frame and suspension system as viewed along the direction of line 2-2 of FIG. 1.

FIG. 3 is a fragmentary end view of the vehicle frame and suspension system as viewed along the direction of line 3-3 of FIG. 2 with portions of the suspension system being broken away for purposes of illustration.

FIG. 4 is a fragmentary side view of the vehicle frame and suspension system showing the suspension system in modified form.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

One embodiment of this invention is illustrated in FIGS. 1-—3 and serves to interconnect a transverse axle 10 to the frame 12 of an axled vehicle which is shown for purposes of illustration as a trailer frame. Frame 12 includes spaced side or longitudinal frame members 14 which are connected at their ends by transverse frame members 16. A tongue assembly 18 extends forwardly from frame members 14 and one or more cross frame members 20 may interconnect longitudinal frame members 14 between transverse frame members 16 to add rigidity to frame 12.

An elongated rigid support member 22 is spaced below and positioned preferably substantially parallel to each longitudinal frame member 14. Axle 10 is welded or otherwise firmly attached to each elongated support member 22 intermediate the length of and preferably at the upper surface 23 of the support member 22. Each support member 22 is sufficiently spaced from the overlying frame member 14 so that axle 10 will be slightly spaced below the frame members, as shown in FIG. 2, when attached to the upper surfaces of the support members. The end portions 24 of each support member are each interconnected to the adjacent overlying frame member 14 by a suspension unit 26.

Each suspension unit 26 preferably comprises an upper bracket 28, a lower bracket 34, and interconnecting resilient members 40. Upper bracket 28 includes an intermediate part 30 which is connected to frame member 14 preferably at the bottom face 15 thereof and opposite end parts 32 which extend substantially laterally outwardly from opposite sides of the frame member and are preferably downwardly inclined. Lower bracket 34 is spaced below upper bracket 28 and includes an intermediate part 36 which is preferably attached to the top surface 23 of support member 22 and opposite end parts 38 which extend outwardly from opposite sides of the support member and are preferably downwardly inclined so as to substantially parallel a corresponding end part 32 of upper bracket 28, as shown in FIG. 3.

A resilient member 40 having end faces 42 and preferably of substantially cylindrical shape is disposed between each pair of corresponding end parts 32 and 38 of brackets 28 and 34 respectively and joined thereto with each of its end faces abutting a confronting surface 25 of a bracket end part. Resilient member 40 is preferably of a rubber composition, but could be formed from synthetic or other materials. As one means of joining resilient member 40 to corresponding bracket end parts 32 and 38, each end face 42 of member 40 may have a recess 43 formed therein to receive the head of a coaxially positioned bolt 44 having a shank 45 which projects outwardly from face 42. A washer 46 surrounds shank 45 and is seated within recess 43, preferably flush with face 42. Washer 46 is bonded to resilient member 40 and serves to secure bolt 44 to member 40. Each bracket end part 32 and 38 is apertured and receives a bolt shank 45 which protrudes from resilient member end face 42. A nut 48 is threaded over the protruding part of the bolt shank and is tightened to draw end face 42 into contact with the receiving end part of the bracket. Although only one resilient member 40 is shown connecting each pair of corresponding bracket end parts of a suspension unit 26, it is contemplated that two or more such members could be used depending upon the load-carrying characteristics desired of the suspension system. All resilient members 40 of each suspension unit 26 are preferably equally laterally spaced from axle 10 and equally angularly inclined, preferably between 30 and 60°, relative to the supporting frame member 14, as shown in FIG. 3.

Upper bracket 28 of each suspension unit 26 may be attached directly to a frame member 14 of the vehicle, such as by bolting or welding, or, preferably, may be bolted to a mounting plate 50 which is welded or otherwise fixedly attached to the bottom face 15 of each frame member 14, as shown in FIG. 3. Lower bracket 34 of each suspension unit 20 may be welded to the end portion 24 of the support member or, preferably, may be bolted thereto as shown in FIG. 3. Each suspension unit 26 is preferably equally laterally spaced from axle 10, but it is understood that the spacing between suspension units and the axle could vary depending upon the way the vehicle is to be loaded and the longitudinal positioning of the axle relative to vehicle frame 12.

In operation, the vehicle load and road shock are transmitted between axle 10 and frame 12 of the vehicle through the resilient members 40 of each suspension unit which, because of their inclination to the vehicle axle and frame, and by being oppositely and angularly positioned relative to each other, are respectively placed in counteracting tension and compression as the vehicle shifts laterally, thereby substantially reducing sidesway. Also, it has been found that as one increases the vehicle load there is a tendency for the suspension system to become more resistant to sidesway.

In order to vary the load-carrying capacity of the vehicle, it is contemplated that a plurality of suspension units 26 can be removably attached to each end portion 24 of a support member 22 and the adjacent frame member 14, as shown in FIG. 4. The number of suspension units so attached to each support member end portion will vary in accordance with the load-carrying characteristics desired of the suspension system.

What I claim is:

1. A suspension system for an axled vehicle having a frame which includes a pair of spaced longitudinal frame members, said suspension system comprising a rigid elongated support member spaced below and substantially parallel to each frame member and having opposite end portions, a transverse axle positioned below said frame members and fixedly attached to each support member intermediate said end portions thereof, a suspension unit carried by each support member end portion and interconnecting each support member and overlying frame member, each suspension unit including a lower bracket and an upper bracket interconnected by resilient members, said lower bracket being attached to the support member end portion carrying the suspension unit and having inclined diverging end parts located one on each side of the support member, said upper bracket being spaced above said lower bracket and connected to the overlying frame member, said upper bracket having diverging end parts positioned one on each side of the overlying frame member which parallel corresponding end parts of said lower bracket, and one of said resilient members being positioned between and having end parts secured to each pair of corresponding end parts of said lower and upper brackets.

2. The suspension system of claim 1 wherein said transverse axle is positioned between each support member and overlying frame member.

3. The suspension system of claim 1 and more than one suspension unit carried by at least one of said end portions of each support member.

4. The suspension system of claim 1 wherein said lower and upper brackets are releasably attached to the support member end portion carrying the suspension unit and overlying frame member respectively.

5. The suspension system of claim 1 wherein said diverging end parts of said lower bracket extend downwardly and laterally outwardly of the support member.

6. The suspension system of claim 1 wherein said resilient member is substantially cylindrical in shape and has opposite transverse end faces which engage confronting surfaces of each pair of corresponding end parts of said lower and upper brackets.